United States Patent [19]
Anthony

[11] Patent Number: 5,946,930
[45] Date of Patent: Sep. 7, 1999

[54] SELF-COOLING BEVERAGE AND FOOD CONTAINER USING FULLERENE NANOTUBES

[76] Inventor: Michael M. Anthony, 11899 NW. 31st St., Coral Springs, Fla. 33065

[21] Appl. No.: 09/008,756

[22] Filed: Jan. 19, 1998

Related U.S. Application Data

[63] Continuation-in-part of application No. 08/824,468, Mar. 26, 1997, Pat. No. 5,865,036.

[51] Int. Cl.$^6$ ................................................. F25D 3/08
[52] U.S. Cl. .............................................. 62/293; 62/371
[58] Field of Search .............................. 62/293, 294, 371, 62/457.3, 457.4

[56] References Cited

U.S. PATENT DOCUMENTS

| | | | |
|---|---|---|---|
| 3,494,142 | 2/1970 | Beck | 62/294 |
| 5,640,705 | 6/1997 | Koruga | 588/16 |
| 5,704,222 | 1/1998 | Hage et al. | 62/293 |

Primary Examiner—William E. Tapolcai
Attorney, Agent, or Firm—Oltman, Flynn & Kubler

[57] ABSTRACT

The apparatus includes a container such as a metal or plastic can containing a product and having a conventional unified bottom and side container wall terminating in an upper sealing flange. A refrigerant receptacle is provided including a receptacle cup having a cup wall. The cup wall has an expandable portion sealingly connected to a top wall to form a refrigerant receptacle chamber. A portion of the top wall is shaped into an invertible conical reservoir for temporary storage of liquified refrigerant. The reservoir has a small port opening at the lowest point for transfer of liquified refrigerant into and out of the refrigerant chamber. Several cup wall sections extend vertically above the top wall wall to conntect to a sealing flange which extends laterally. The spaces between the cup wall sections act as passageways for the product. The receptacle is filled with a sold or powdered form of carbon molecules of Fullerene nanotubes. A conventional beverage can lid is further provided, including a lid panel with a lid opener mechanism and a lid lateral edge.

12 Claims, 11 Drawing Sheets

SELF-COOLING BEVERAGE AND FOOD CONTAINER USING FULLERENE NANOTUBES

This application is a continuation-in-part of application Ser. No. 08/824,468 filed on Mar. 26, 1997, now U.S. Pat. No. 5,865,036.

BACKGROUND OF INVENTION

1. Field of Invention

The present invention generally relates to the field of food and beverage containers. More specifically the present invention relates to a self-cooling container apparatus containing a beverage or other food product and to methods of assembling and operating the apparatus. The terms "beverage," "food," "food products" and "container contents" are considered as equivalent for the purposes of this application and used interchangeably.

For the first several preferred embodiments, the apparatus includes a container such as a metal or plastic can containing a product and having a conventional unified bottom and side container wall terminating in an upper sealing flange referred to hereinafter as a container rim. A refrigerant receptacle is provided including a receptacle cup having a cup wall. The cup wall having an expandable portion sealingly connected to a top wall to form a refrigerant receptacle chamber. A portion of the top wall shaped into an invertible conical reservoir for temporary storage of liquified refrigerant; the reservoir having a small port opening or a semipermeable membrane, at the lowest point for transfer of liquified refrigerant into and out of the refrigerant chamber, hereinafter referred to as the refrigerant port. Several cup wall sections extend vertically above the top wall to connect to a sealing flange which extends laterally, hereinafter referred to as a receptacle rim. The spaces between the cup wall sections act as passageways for product and hereinafter referred to as product passageways. The receptacle is filled with a solid or powdered form of carbon molecules of Fullerene nanotubes ($C_n$,n>1,000,000), or alternatively, an expanded metal sponge is encased within the receptacle. The terms Fullerene nanotubes, expanded metal sponge are considered equivalent for the purposes of this application and used interchangeably. A conventional beverage can lid is further provided, including a lid panel with a lid opener mechanism and a lid lateral edge.

A method of apparatus assembly is provided including the steps of filling the receptacle with Fullerene nanotubes or an expanded metal sponge; lowering the receptacle through the container rim and resting the receptacle rim on top of the container rim; filling the reservoir formed on the top surface of the receptacle with liquified refrigerant; transporting the container and filled receptacle to the product filling machinery, during which period the liquified refrigerant fills the Fullerene nanotubes inside the receptacle through the refrigerant port; filling the container with product so that a substantial amount of the receptacle's surface area is immersed in the product; placing the lid on top of the receptacle so that the lid lateral edge rests on the receptacle rim; and seaming the lid lateral edge and receptacle rim onto the container rim using conventional beverage and food container seamers. After seaming, the refrigerant is warmed to ambient temperature, whereupon it partially evaporates and develops internal pressure against the receptacle wall and evaporating gas exits from the receptacle through the refrigerant port into the container until the pressure within the container equals the pressure within the receptacle, whereupon evaporation stops.

A method of operation is provided in which the consumer operates the lid opener mechanism to open the lid and thereby releases vaporized refrigerant from the receptacle and the container. The pressure within the receptacle becomes greater than the pressure outside the receptacle, and the reservoir is forced by the pressure inside the receptacle to invert into a dome so that the refrigerant port is now located above the product level and the gas exits therefrom to the atmosphere. The remaining liquid refrigerant progressively boils into a vapor state and escapes from the Fullerene nanotubes, through the refrigerant port, and through the container opening, drawing heat out of the food or beverage through receptacle walls. Once all the refrigerant has been released, the consumer can consume the product.

As an alternative to the cup with an expandable wall, the apparatus includes a container such as a can containing a product, a secondary receptacle placed inside and at the bottom of said container having a unified bottom wall, side wall, and a top wall forming a refrigerant receptacle and providing a broad surface area for heat transfer and having at least 80 percent of its volume filled with carbon Fullerene nanotubes and a liquified refrigerant such as carbon dioxide or nitrogen. A small vertical tube member projects from the receptacle and terminates above the product level. The tube member terminates above the product level with a refrigerant port. A conventional beverage can lid is further provided, including a lid panel with a lid opener mechanism and a lid lateral edge.

An alternative method of apparatus assembly is provided including the steps of filling the receptacle with Fullerene nanotubes or alternatively, encasing an expanded metal sponge in the receptacle; charging the receptacle with a liquified refrigerant through the refrigerant port; lowering the receptacle into the container so that the receptacle rests at the bottom of the container; placing the lid on top of the container, so that the lid lateral edge rests on the container rim; filling the container with product so that a substantial amount or all of the receptacle's surface area is immersed in the product, and seaming the lid lateral edge unto the container rim using conventional beverage and food container seamer machinery. After seaming the lid and the container, the refrigerant is warmed to ambient temperature, whereupon it partially evaporates and develops internal pressure against the receptacle wall, and gas exits from the receptacle into the container through the refrigerant port at the end of a vertical tube above the product level until the pressure within the container equals the pressure within the receptacle. The evaporation stops thereafter.

A method of operation is provided in which the consumer operates the lid opener mechanism to open the lid and thereby releases vaporized refrigerant from the receptacle. The remaining liquid refrigerant progressively boils into a vapor state and escapes from the Fullerene nanotubes, through the receptacle port, and through the container opening, drawing heat out of the food or beverage through receptacle walls. Once all the refrigerant has been released, the consumer can consume the product.

2. Description of the Prior Art

The use of high pressure refrigerants such as carbon dioxide and nitrogen for self-cooling beverage containers has been known for some time now. However, due to the high containment pressure of the liquified form of these gases, very strong and thick-walled containers are needed to store enough quantities to cool a conventional beverage container. The use of low pressure gases, such as HFCs and CFCs have resulted in a greater and urgent need for more environmentally benign gases, such as carbon dioxide and nitrogen, since these gases can be recovered and recycled from the atmosphere without a change in the net balance of global warming gases or ozone depleting gases. Also, the cost of the lower pressure gases is far higher than the cryogenic gases such as carbon dioxide and nitrogen, and the thermodynamic properties of the latter are far more suitable for the purposes of cooling the contents of a beverage or food container. Another good reason why the higher pressure gases are more suitable for this application, is that they present very little or no health hazards to the consumer, and in fact can be in direct contact with the food or beverage product without creating any adverse effects for the consumer.

The natural structure of most fibrous fruits and vegetables is amazingly useful and elegant for storing pressurized liquids such as water, fructose, glucose, acetic acids, citric acids etc. Most naturally occurring containers such as apples and oranges, consist of sponge-like fibrous interiors holding the liquid in place with an economy in skin thickness unprecedented in engineering design.

Changes in natural temperature can exert tremendous pressures on the skin of the fruit without any evident damage. This is due to the ingenious method of containing this pressure. This example from nature, relies on distribution of the pressure to smaller fibrous compartments each of which can hold a much greater pressure due to its smaller surface area. While the entire surface area for heat exchange is maximized by these multitudes of tiny compartments, the pressure and stress retention properties have been enhanced considerably.

Recent developments have shown that the element carbon can be made into tiny compartmentalized tubes called Fullerene nanotubes. These tubes can hold pressurized refrigerants such as nitrogen and carbon dioxide with incredible efficiencies even at room temperature.

While previous attempts to use carbon matrices to store refrigerants have been successful, the efficiency has been too low for applications such as the present invention. Thus, the potential use of simple carbon matrices for self-cooling beverage containers is limited in scope and efficiency. Firstly, a back pressure of some 200 pounds per square inch (200 psi) is needed to force the matrix to absorb the refrigerant at an efficiency of about 10 percent concentration by volume.

Fullerene nanotubes can be manufactured in different diameters and lengths. This fact allows the present invention to effectively use this property to design Fullerene nanotubes that will store various gases without the need for any back pressure even at room temperature.

By designing the Fullerene nanotubes to store the refrigerant for the present invention at a pressure slightly higher than atmospheric pressure, the refrigerant could be stored under stable conditions in a receptacle of nominal wall thickness, such as in a plastic membrane containing the Fullerene nanotubes. Further the refrigerant such as carbon dioxide could advantageously be in direct communication with the contents of the container thereby eliminating the need for expensive valving. This combination of parameters can be used to manufacture an environmentally friendly, cost effective and commercially feasible self-cooling container.

It is thus an object of the present invention to provide a simple and cost-effective apparatus for cooling the contents of a container which uses Fullerene nanotubes to store high pressure inert gases for cooling a beverage or food product at room temperature.

It is another object of the present invention to provide such an apparatus with no complicated valving.

It is a further object of this invention to provide for an apparatus containing a high pressure liquified refrigerant such as carbon dioxide in a thin walled and inexpensive container, and to expose the beverage or food product to be cooled to a maximum surface area for rapid and efficient thermodynamic heat transfer.

It is another object of this invention to provide an apparatus in which a smaller volume of cold refrigerant is exposed to a larger heat transfer surface area such as by corrugating the refrigerant receptacle wall, to increase the evaporation rate of the liquified refrigerant.

It is still another object of the present invention to provide a self-cooling container apparatus containing a refrigerant receptacle filled with Fullerene nanotubes with either expandable or narrowly spaced apart walls for rapid and efficient transfer of heat out of the container contents.

It is still another object of this invention to provide such an apparatus which both releases refrigerants above the level of the container contents and opens a passage for the container contents to be consumed with a single action by the consumer.

It is still another object of this invention to provide such an apparatus containing a refrigerant receptacle filled with Fullerene nanotubes or an expanded metal sponge, with expandable walls that respond to pressure changes within and without the receptacle walls so that the receptacle walls will be stress-free during its operation.

It is also another object of this invention to provide such an apparatus with a reservoir into which liquified refrigerant can be easily poured during charging, so that the refrigerant can easily flow through a port in the reservoir into the Fullerene nanotubes for storage and to advantageously provide this means of charging the receptacle with refrigerant during manufacture of the apparatus without slowing the typical beverage bottling process.

It is finally an object of the present invention to provide such an apparatus which cools the contents of a container without any changes to the manufacturing processes of a conventional beverage container.

SUMMARY OF THE PRESENT INVENTION

The present invention accomplishes the above-stated objectives, as well as others, as may be determined by a fair reading and interpretation of the entire specification.

A rapid refrigeration apparatus is provided including a container having a container upper end, a container wall with a container opening in the container upper end, bordered by a container rim, the container contents; a receptacle extending within the container and containing either a solid or powdered form of carbon molecules of Fullerene nanotubes ($C_n$, n>1,000,000) filled with a liquified refrigerant, including a receptacle cup having a cup wall; the cup wall having at least a portion that is expandable and is sealingly connected to a top wall to form a receptacle refrigerant chamber; the top wall having an invertible reservoir for temporary storage of liquified refrigerant; the reservoir having a refrigerant port for transfer of refrigerant into and out of the refrigerant chamber; the cup wall having small cup wall sections extending vertically above the top wall to connect to a receptacle rim; the spacing between the small cup wall sections acting as passageways for product;

and a conventional beverage can lid sealingly secured to the receptacle rim and the container rim and including a lid panel with a lid opener mechanism for release of the refrigerant from the receptacle into the atmosphere and for release of the container contents through the product passageways for consumption. Conventional consumption; the lid opening mechanism including a lid opening mechanism activation mechanism, for voluntarily opening the lid opening mechanism at a selected moment in time; the receptacle reservoir preferably including an invertible stepped conical wall portion terminating at a lower apex, a refrigerant port at the apex, so that the conical wall inverts when the container lid opening mechanism is activated to open the lid, causing the internal pressure of the receptacle to be greater than the external pressure acting on the receptacle, and causing the conical walls of the reservoir to be inverted; raising the refrigerant port against or in close proximity to the underside of the lid and above the product level, and causing the liquified refrigerant stored in the Fullerene tubes to evaporate and to draw heat from the container contents through the walls of the receptacle and cooling the container contents and exiting the container through the lid opening mechanism; so that tilting the apparatus will cause the container contents to pass around the receptacle and through the product passageways and through the lid opening mechanism to be consumed.

A rapid refrigeration apparatus is also provided including a primary container having a unified primary container bottom wall and side wall, a primary container side wall having an inwardly beveled primary upper side wall portion surrounding a primary container opening, the primary container opening being bordered by a primary container rim;

a secondary container smaller than and positioned within the primary container, the secondary container having unified bottom wall, side walls, and top walls, forming a refrigerant storage chamber, the top wall having a tube member in fluid communication with the inside of the secondary container, projecting vertically therefrom, the tube member terminating in a refrigerant port above the container contents, but below the primary container opening for the flow of refrigerant vapor into and out of the refrigerant storage chamber; the secondary container forming a receptacle containing Fullerene nanotubes forming a collection of small storage chambers for refrigerant; refrigerant contained within the receptacle and within the Fullerene nanotubes; container contents contained within the primary container; a lid sealingly secured to the secondary container rim and including a lid opening mechanism for releasing the refrigerant from the receptacle chamber into the atmosphere and for releasing the container contents from the primary container for consumption; the lid opening mechanism including a lid opening mechanism activation mechanism for voluntarily opening the lid opening mechanism at a selected moment in time; so that activating the lid opening mechanism lowers the pressure in primary container and causing the liquified refrigerant stored in the Fullerene tubes to evaporate and to draw heat from the container contents through the walls of the receptacle and cooling the container contents and exiting the container through the lid opening mechanism; so that tilting the apparatus will cause the container contents to pass through the lid opening mechanism to be consumed.

BRIEF DESCRIPTION OF THE DRAWINGS

Various other objects, advantages, and features of the invention will become apparent to those skilled in the art from the following discussions taken in conjunction with the following drawings, in which.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms.

Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Referring to FIGS. 1–6, a self-cooling container apparatus 10 containing a beverage or other food item 12 is disclosed, as well as apparatus 10 assembly and operation methods.

Apparatus 10 includes container 11 such as a can or a bottle containing a beverage 12 and having a conventional unified bottom and side container wall 13 terminating in a container rim 14 defining a container opening 15. A receptacle 16 is provided including a receptacle cup 17 having a cup wall 18. Said cup wall 18 having an expandable portion 19 sealingly connected to a top wall 20 to form a receptacle refrigerant chamber 21. Said top wall 20 shaped in the form of an invertible conical reservoir 22 for temporary storage of liquified refrigerant 23, and having a refrigerant port 24 at the lowest point for fluid communication and transfer of refrigerant 23 into and out of the refrigerant chamber 21. A receptacle 16 further having several small cup wall sections 25 extending vertically above the top wall 20 to connect to a sealing receptacle rim 26 and the spacing between the small cup wall sections 25 act as passageways 27 for the beverage 12. The receptacle 16 is filled with either a solid or powdered form of carbon molecules of Fullerene nanotubes ($C_n$, n>1,000,000) 28. A conventional beverage can lid 29 is further provided, including a lid panel 30 with a lid opener mechanism 31 and a lid lateral edge 32.

METHOD OF OPERATION

Figure 6:
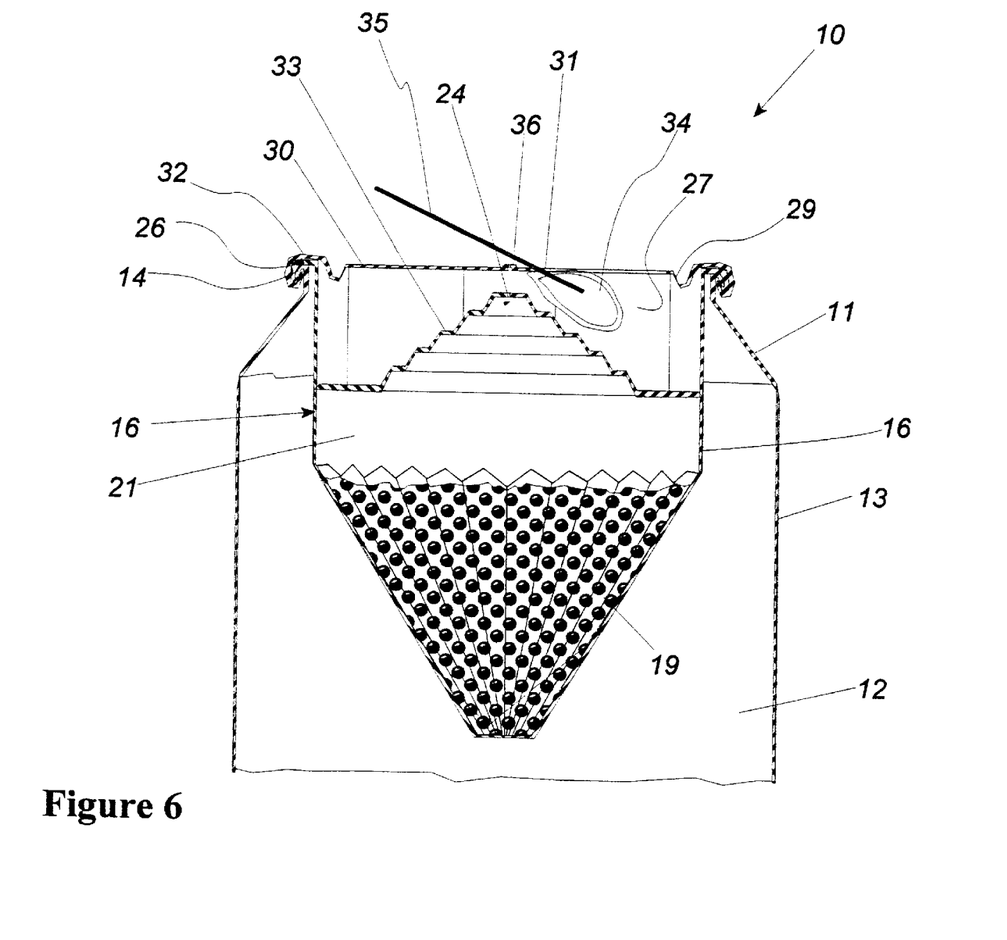
FIG. 6 is a partial magnified cross-sectional view of the apparatus according to one of several first embodiments of the invention, showing the container filled with container contents and the receptacle shown in FIG. 1 immersed in the container contents, the receptacle rim, the container rim and the lid rim seamed together to seal the container showing the lid opening mechanism activated, and showing the receptacle refrigerant reservoir inverted upwardly, with the refrigerant port close to the underside of the lid and above the container contents level.

Opening the lid opener mechanisms 31 releases the refrigerant 23 vapor initially present within the container 11. The loss of pressure causes the pressure within receptacle 16 to invert reservoir 22 upwardly above the container contents level, raising refrigerant port 24 close to the under side of can lid panel 30. The remaining refrigerant boils off and changes from the liquid phase to the gaseous phase, drawing heat from the beverage through the receptacle walls to the Fullerene nanotubes and exiting container 11 through lid opener mechanism 31. Once all the refrigerant 23 has been released the beverage 12 can flow around receptacle 16 through passageways 27 and through lid opener mechanism 31 to be consumed.

METHOD OF ASSEMBLY

Figure 3:
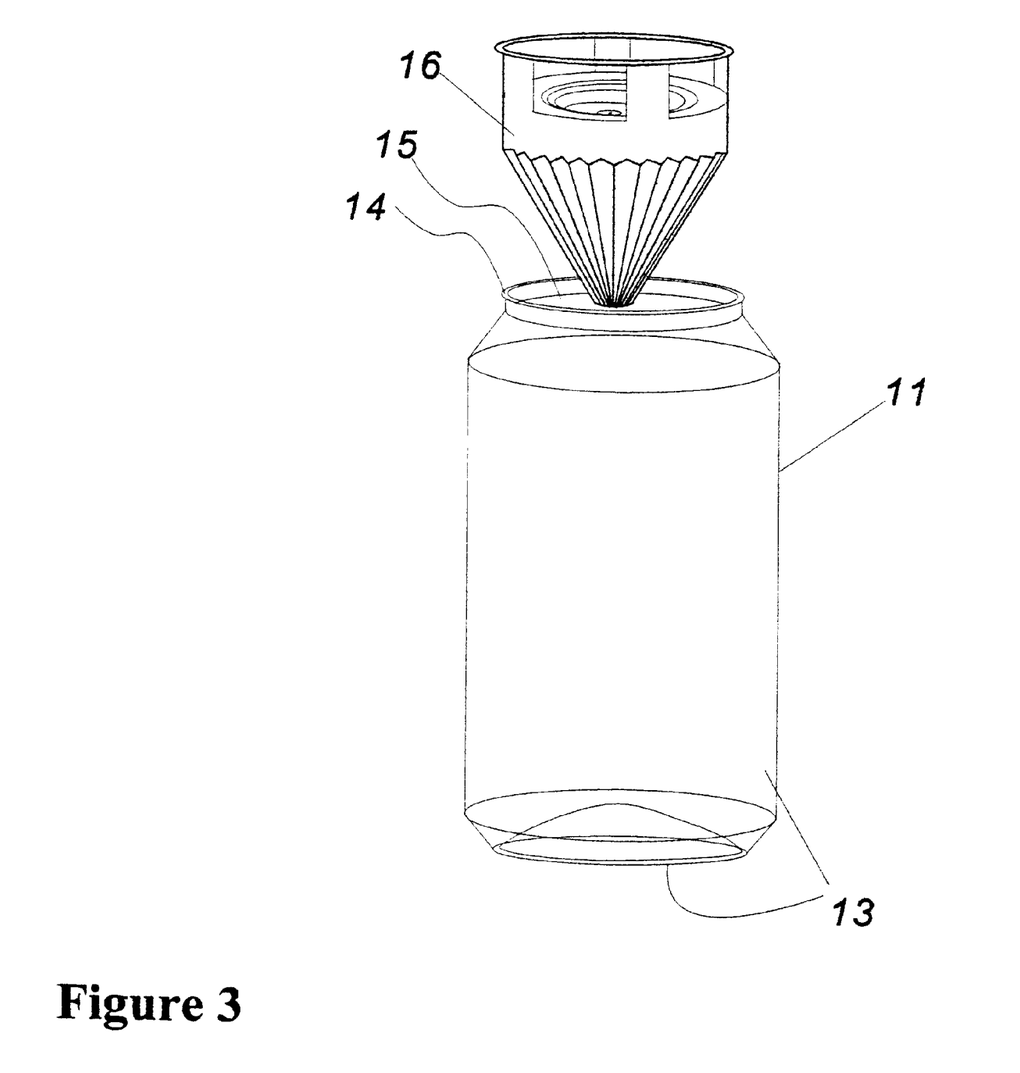
FIG. 3 is a view showing the receptacle shown in FIG. 1 being lowered into the container through the rim.
Figure 4:
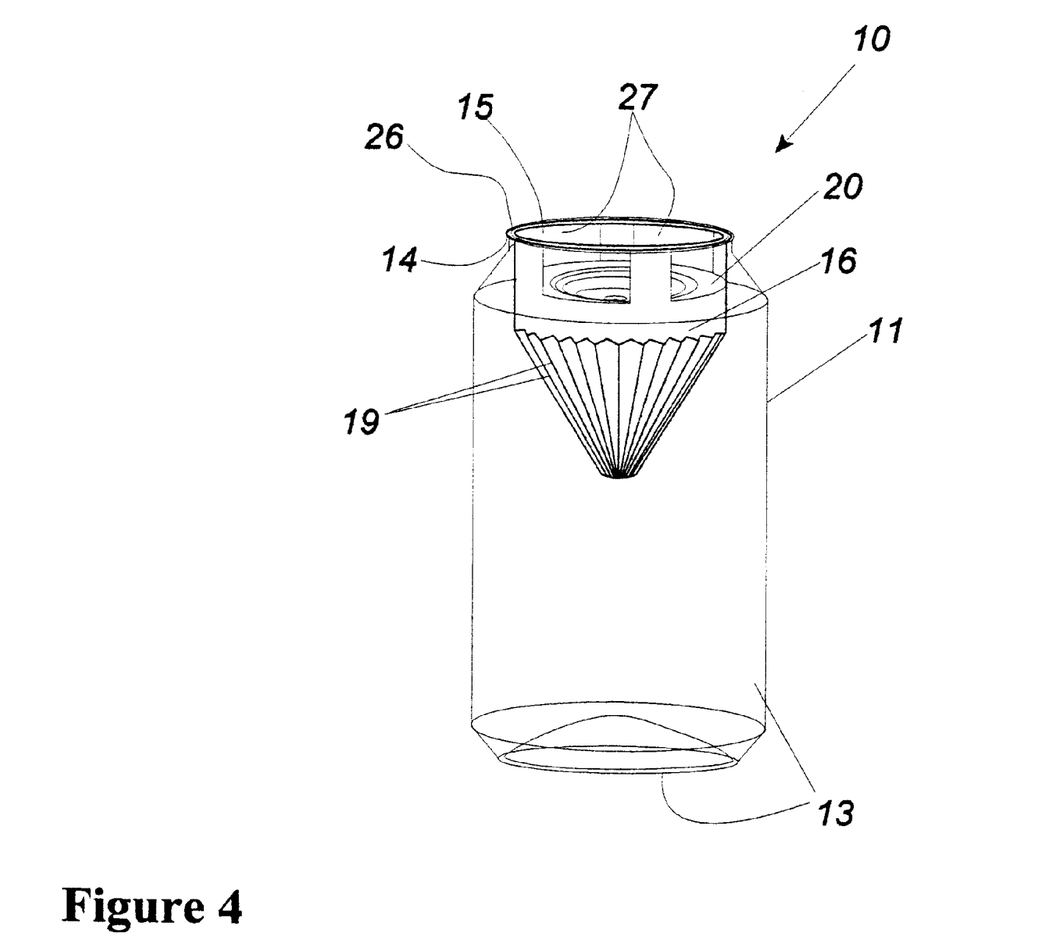
FIG. 4 is a view of the container and the receptacle shown in FIG. 1, showing the receptacle fully lowered into the container, with the receptacle rim resting on the container rim.
Figure 5:
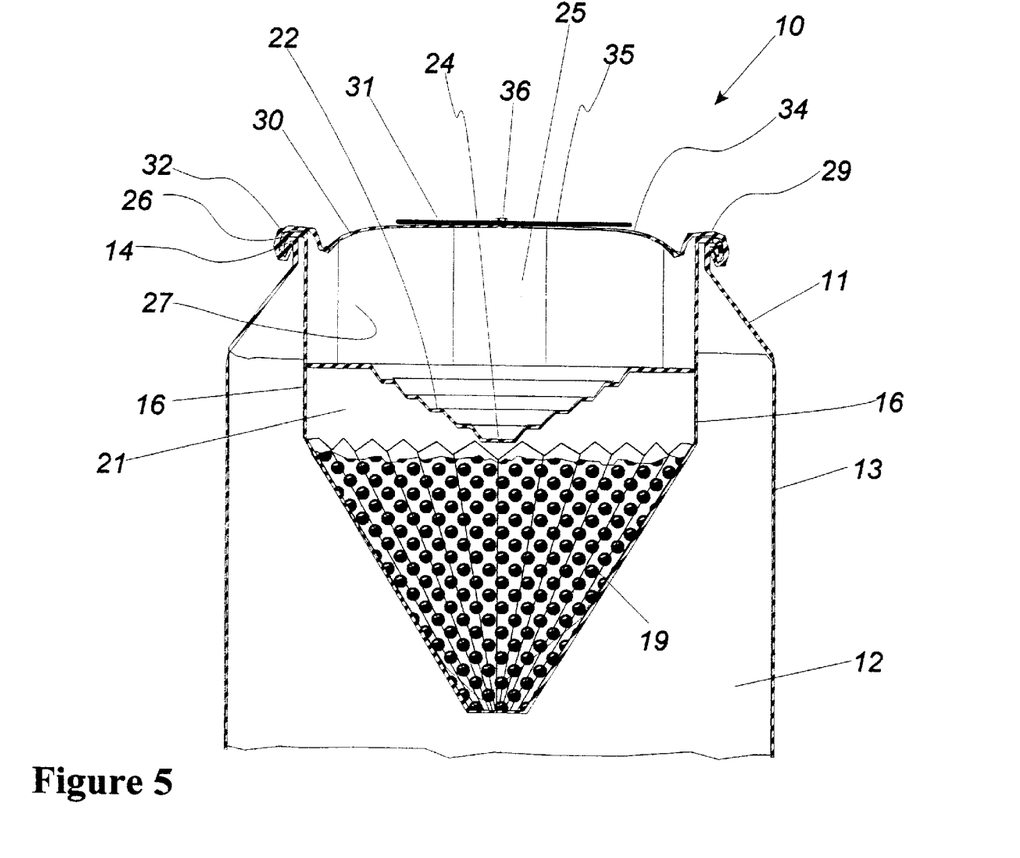
FIG. 5 is a partial magnified cross-sectional view of the apparatus according to one of several first embodiments of the invention, showing the container filled with container contents and the receptacle shown in FIG. 1 immersed in the container contents, and showing the receptacle rim, the container rim and the lid rim seamed together to seal the container.

The method of manufacture includes the steps of filling the receptacle 16 with Fullerene nanotubes 28, sealing the receptacle 16; applying a vacuum to the receptacle 16 to remove all air and gases trapped in the Fullerene nanotubes 28; lowering the receptacle 16 through the container rim 14 so that the receptacle rim 26 rests evenly on the container rim 14; pouring cold liquified refrigerant 23 into refrigerant reservoir 22 so that refrigerant 23 is transferred into Fullerene nanotubes 28 during transportation of the assembly to a beverage 12 filling station; filling the beverage 12 into the container 11; seaming the container rim 14, the receptacle rim 26 to the lid lateral edge 32. After seaming, refrigerant 23 warms and starts to evaporate from the receptacle 16 by absorbing heat from the beverage 12, developing internal pressure inside receptacle 16 and transferring refrigerant 23 through the refrigerant port 24 into the container 11. After the pressure inside the container 11 equals the pressure inside the receptacle 16, the refrigerant 23 stops evaporating, equilibrium is maintained, and there will be no stresses on the walls of receptacle 16. The container 11 and the lid 29 are designed to withstand the equilibrium pressure during storage and the shelf-life of the apparatus 10.

STRUCTURAL VARIATIONS

Figure 1:
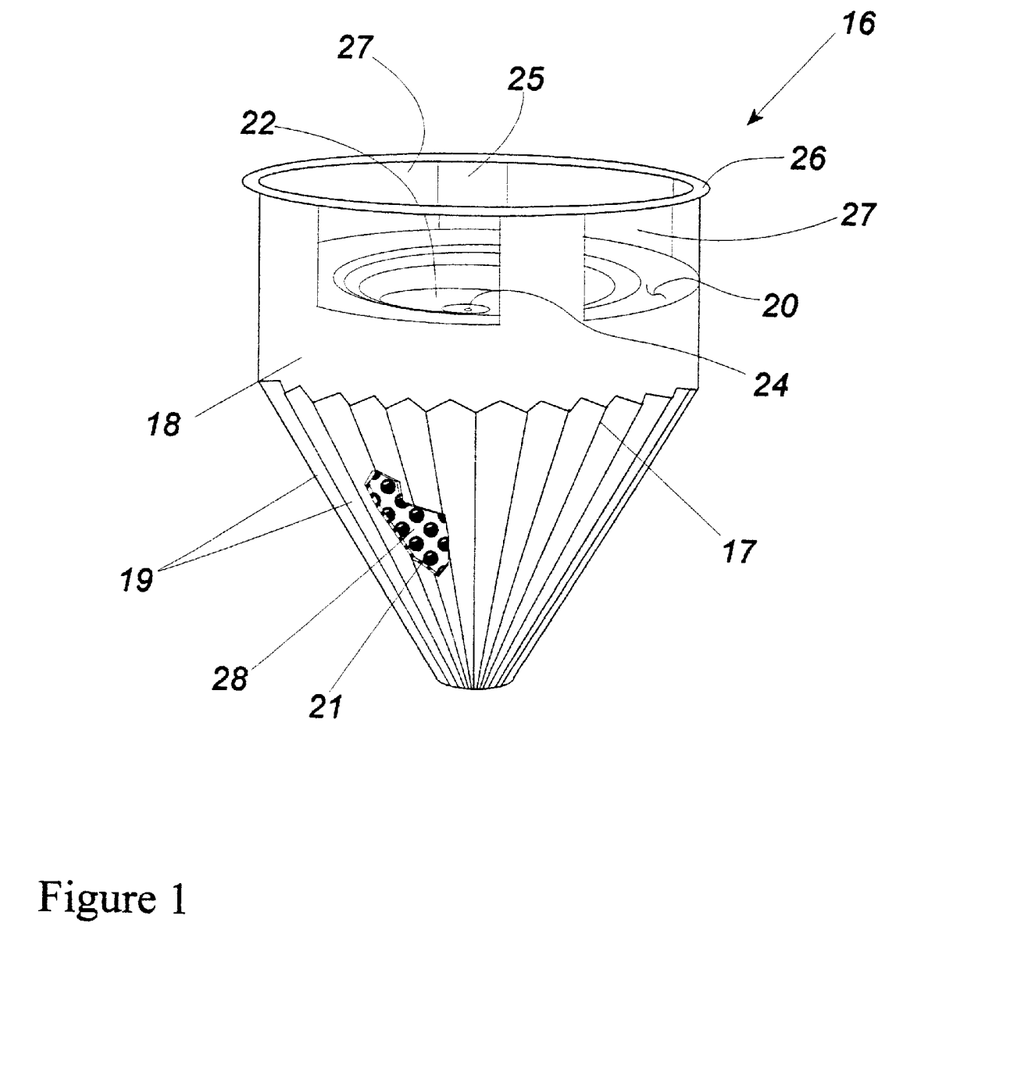
FIG. 1 is a perspective view of one form of the receptacle according to the first embodiment of the invention showing the receptacle expandable side wall portions, the beverage passageways, the refrigerant reservoir, the receptacle rim, and a cutaway view of the receptacle wall showing the Fullerene nanotubes contained therein.

It is preferred that receptacle cup wall 18 be formed from a flexible material such as a metal foil or preferably a suitable plastic and that receptacle cup wall 18 be undulated about its lateral circumference to maximize its surface area and the expandable maximum volume of the receptacle 16. Receptacle top wall 20 is formed into a reservoir 22 to temporarily store refrigerant 23 during charging. Reservoir 22 is preferably shaped like a conical bellow projecting into the receptacle 16 and can be inverted into a conical projection 33 pointing upwardly in the direction of can lid 29 when a sudden pressure builds up inside receptacle 16.

Refrigerant Port 24 is preferably located at the apex of the conical reservoir 22. Refrigerant port 24 can take the form of a small hole or a semipermeable membrane allowing only refrigerant molecules 23 to pass through into and out of receptacle 16. Passageways 27 can be maximized by minimizing the width of cup wall sections 25. Alternatively, cup wall sections 25 can be replaced by a single reinforced cup wall section to form a large and open passageways for the beverage 12. Receptacle 16 can be manufactured by blow-molding or injection-molding any plastic suitable for use with food and beverages.

Lid opener mechanism 31 may be an ordinary pull tab or a trap door region 34 defined by a stress riser grove which is depressed and torn free to pivot into container 11 by a lever 35 pivoting on a rivet 36. Another suitable lid opener mechanism is a port and a disk ECO-TOP™ opener mechanism, readily available from manufacturers such as Ball Metal Container Company.

Figure 2:
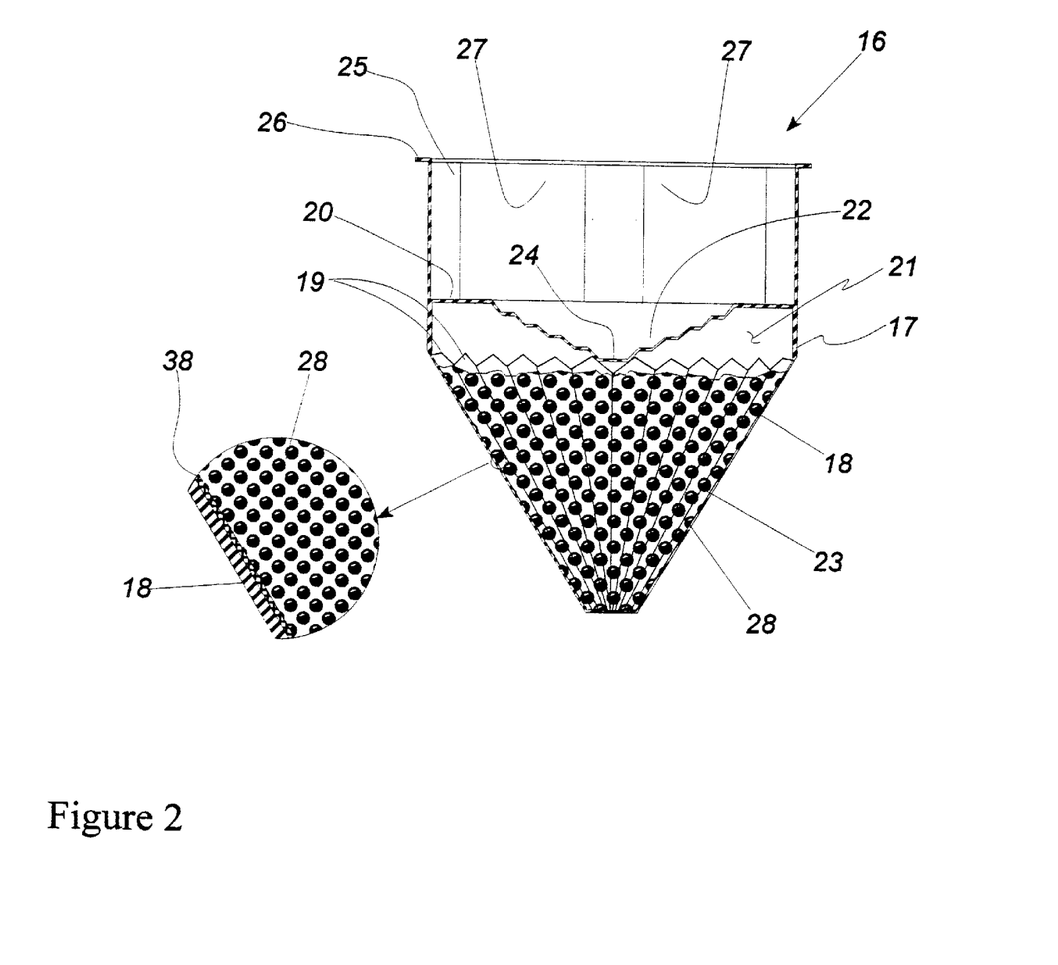
FIG. 2 shows a cross-sectional view of the receptacle and a blowup of a small cross-section of the receptacle wall according to one of several first embodiments of the invention and showing an expanded metal sponge matrix in place of Fullerene nanotubes, with a sealing agent sealing off the sponge surface to form a multitude of tiny sealed chambers.

Once again the can lid 29 is secured to container 11 by seaming or crimping its lateral edge 32 onto the container rim 14 with a conventional can seamer. Since the seamer equipment and procedure are conventional, any existing seamed or crimped can lid 29 design may be used without modification to the lid. A conventional pull tab may be used directly with the assembly to achieve the desired purpose of this invention. The principle herein revealed depends on the balance of forces between the capillary action of the Fullerene nanotubes 28 on the refrigerant 23 molecules, and the pressure force generated by the liquified refrigerant 23. Thus, Fullerene nanotubes 28 could be replaced by a metal or plastic sponge 37. The sponge surface can be sealed off by a suitable plastic film or an epoxy layer 38.

OPERATIONAL CHARACTERISTICS

As liquid refrigerant 23 boils into a vapor state, it exits the Fullerene nanotubes and exits receptacle 16. The refrigerant 23 extracts and carries away heat from the beverage 12. During this process, the pressure of the liquid phase is greater than one atmosphere and the receptacle 16 remains partially expanded. As the pressure of the refrigerant 23 falls due to rapid self-cooling, cup wall expandable portion 19 relaxes and the weight of the beverage or food product 12 urges the receptacle 16 to a smaller volume. This reduction in volume agitates the cold Fullerene nanotubes 28 forcing further heat transfer. The increased heat absorption results in an increase in the rate of evaporation. This increase in the rate of evaporation produces more refrigerant 23 gases within receptacle 16 and thus causes the pressure of the refrigerant 23 to increase. The increase in pressure within receptacle 16 causes receptacle 16 to again expand its volume. Once again as self-cooling of the liquified refrigerant 23 occurs, the cycle repeats. This rapid cyclic variation in receptacle 16 volume causes the refrigerant 23 to evaporate at a higher rate than would be expected if refrigerant 23 were evaporating within a rigid receptacle of fixed volume.

SECOND PREFERRED EMBODIMENT

Figure 7:
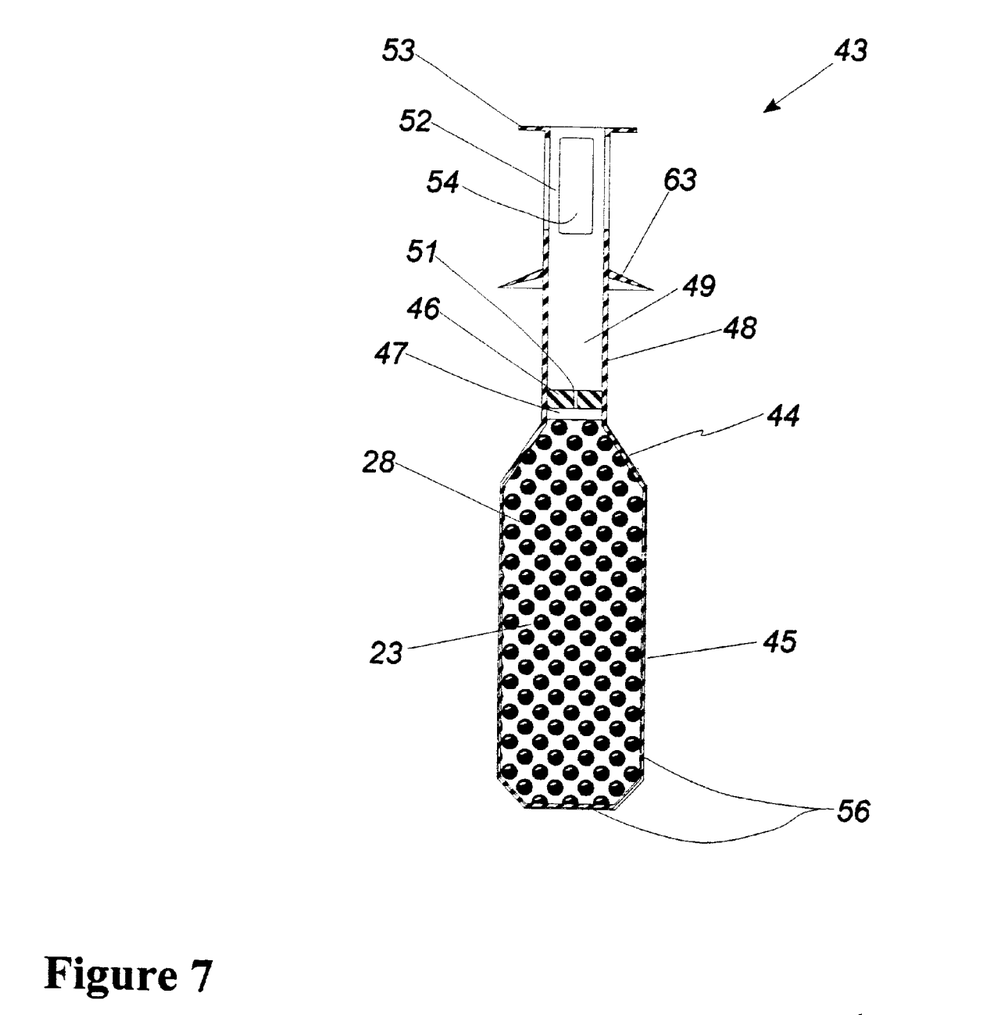
FIG. 7 shows a cross-sectional view of another form of the receptacle according to a second embodiment of the invention for use with bottle containers, with the receptacle rim, contents passageways, refrigerant port and the receptacle filled with the Fullerene nanotubes.
Figure 8:
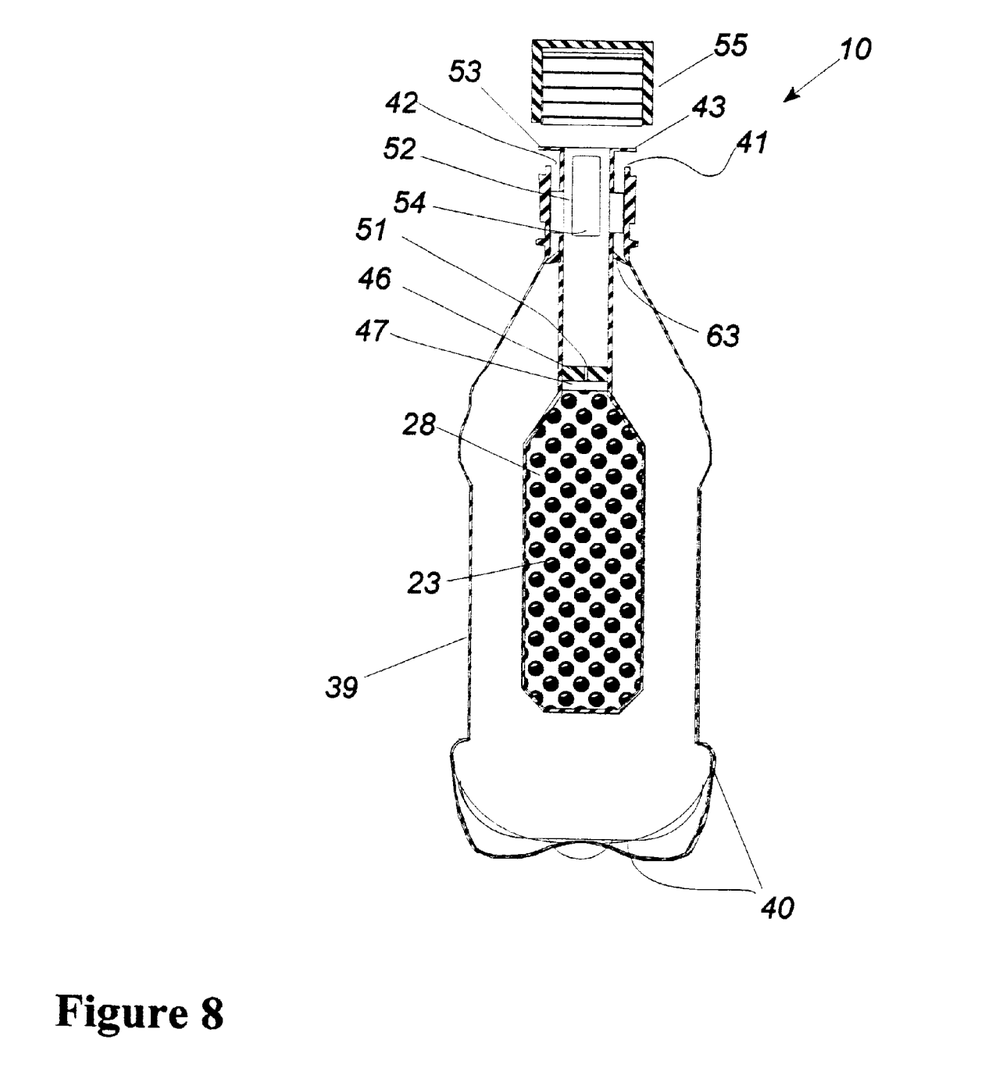
FIG. 8 shows a cross-sectional view through a bottle container with the receptacle shown in FIG. 7 contained therein, and the cap closure ready to be threaded to the threaded neck of the bottle.
Figure 9:
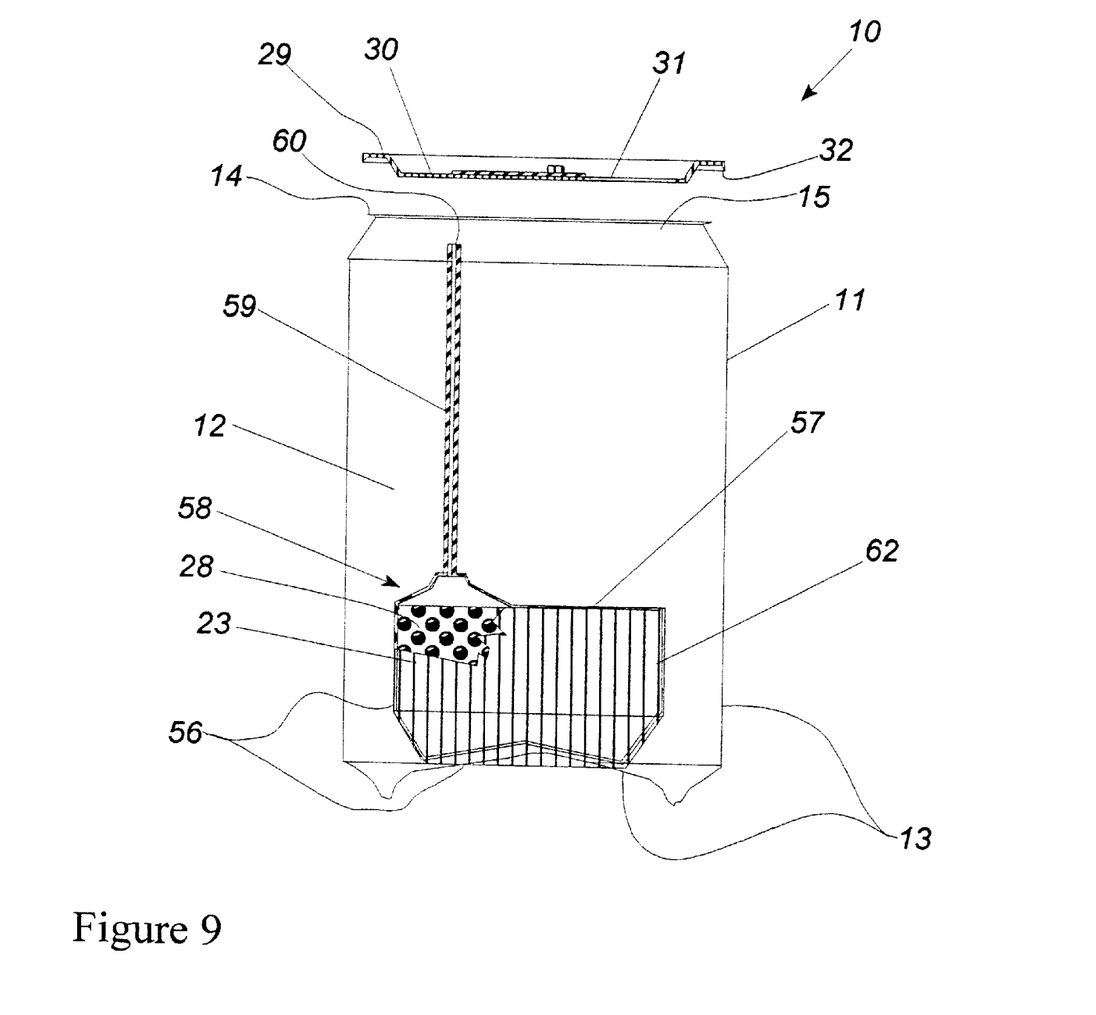
FIG. 9 shows a partial cutaway view of the receptacle according to a third embodiment of the invention, immersed in container contents and a container lid ready to be seamed onto the container rim.

Referring to FIGS. 7, 9, and 8, a self-cooling container apparatus 10 containing a beverage or other food item 12 is disclosed, as well as apparatus 10 assembly and operation methods.

Apparatus 10 includes bottle container 39 containing a beverage 12, and having a conventional unified bottom and side container wall 40 terminating in a container neck rim 41 defining a container opening 42. A receptacle 43 is provided including a receptacle 43 having a flexible receptacle wall 44. The flexible receptacle wall 44 having an expandable wall portion 45. A portion of the cylindrical upper wall 48 of the receptacle 43 acts as a refrigerant reservoir 49 for temporary storage of liquified refrigerant 23; a plug member 46 seals the top of the receptacle 43 after the receptacle 43 is filled with the Fullerene nanotubes 28; the plug 46 having a refrigerant port 51 for fluid communication and transfer of refrigerant 23 into and out of the refrigerant chamber 47. The upper portion of the upper receptacle wall 48 of the receptacle 43 is perforated to form several small wall sections 52 extending vertically above refrigerant reservoir 49, to connect to a sealing receptacle rim 53; the spacing between the small wall sections 52 act as passageways 54 for the beverage 12.

The receptacle 43 is first filled with either a solid or powdered form of carbon molecules of Fullerene nanotubes ($C_n$,n>1,000,000) 28 and then plugged with plug 46, and then it is inserted into the bottle container 39. A compressible ring member 63 compresses when the receptacle 58 is pushed into the bottle container 39, so that it slides through the neck of the bottle container 39 and expands back to its original diameter in the larger opening within the bottle container to permanently trap the receptacle 58 in the bottle container 39. A conventional threaded bottle closure 55 is further provided to mate with the threaded portion of bottle container neck rim 41 and to sealingly clamp receptacle rim 53 against container neck rim 41.

METHOD OF OPERATION

Opening the threaded closure 55 releases the refrigerant 23 vapor initially present within the bottle container 39. The loss of pressure causes the remaining refrigerant 23 to boil off through the refrigerant port 51 and changes from the liquid phase to the gaseous phase, drawing heat from the beverage 12 through the receptacle walls 44 to the Fullerene nanotubes 28 and exiting container 39 through the threaded closure 55. Once all the refrigerant 23 has been released the beverage 12 can flow around receptacle 43 through passageways 54 and through container neck rim 41 to be consumed.

METHOD OF ASSEMBLY

The method of manufacture includes the steps filling the receptacle 43 with Fullerene nanotubes 28, sealing the receptacle 43 with a plastic plug 46; applying a vacuum to the receptacle 43 to remove all air and gases trapped in the Fullerene nanotubes 28; lowering the receptacle 43 through the bottle container neck rim 41 so that the receptacle rim 53 rests evenly on the container neck rim 41; pouring cold liquified refrigerant 23 into refrigerant reservoir 49 before or after insertion into the bottle, so that refrigerant 23 is transferred into Fullerene nanotubes 28 during transportation of the assembly to a beverage 12 filling station; filling the beverage 12 into the bottle container 39; sealing the container with a threaded closure 55 so that the receptacle rim 53 is clamped between the threaded closure 55 and the container neck rim 41. After sealing, refrigerant 23 warms and starts to evaporate from the receptacle 43 by absorbing heat from the beverage 12, developing internal pressure inside receptacle 43 and transferring refrigerant 23 through the refrigerant port 51 into the bottle container 39. After the pressure inside the bottle container 39 equals the pressure inside the receptacle 43, the refrigerant 23 stops evaporating, equilibrium is maintained, and there will be no stresses on the walls of receptacle 43. The container 39 and the threaded closure 55 are designed to withstand the equilibrium pressure during storage and the shelf-life of the apparatus 10.

STRUCTURAL VARIATIONS

It is preferred that receptacle wall 44 be formed from a flexible material such as a metal foil or preferably a suitable plastic and that receptacle wall 44 be undulated about its lateral circumference to maximize its surface area and the expandable maximum volume of the receptacle 43. A portion of the cylindrical upper wall 48 of said expandable receptacle wall 45 acts as a refrigerant reservoir 49 for temporary storage of liquified refrigerant 23, and having a refrigerant port 51 through plug 46 for fluid communication and transfer of refrigerant 23 into and out of the refrigerant chamber 47. Plug 46 could also be made from a semipermeable material, so that only a refrigerant 23 gases can pass through it. Thus, there would be no need to form the refrigerant port 51.

Passageways 54 can be maximized by minimizing the width of cup wall sections 52. Alternatively, cup wall sections 52 can be replaced by a single reinforced cup wall section to form a large and open passageways for the beverage 12.

Receptacle 43 can be manufactured by blow-molding or injection-molding by any plastic suitable for use with food and beverages. Alternatively, receptacle 43 can be manufactured from aluminum or steel material.

Threaded closure 55 can be a plastic injection molded part, or a threaded metal cap. Alternatively, threaded closure 55 can be a crimpable closure commonly used with glass bottle containers.

OPERATIONAL CHARACTERISTICS

As liquid refrigerant 23 boils into a vapor state, it exits the Fullerene nanotubes 28 and exits receptacle 43. The refrigerant 23 extracts and carries away heat from the beverage 12. During this process, the pressure of the liquid phase is greater than one atmosphere and the receptacle 43 remains partially expanded. As the pressure of the refrigerant 23 falls due to rapid self-cooling, expandable wall portion 45 relaxes and the weight of the beverage or food product 12 urges the receptacle 43 to a smaller volume. This reduction in volume agitates the cold Fullerene nanotubes 28 forcing further heat transfer. The increased heat absorption results in an increase in the rate of evaporation. This increase in the rate of evaporation produces more refrigerant 23 gases within receptacle 43 and thus causes the pressure of the refrigerant 23 increases. The increase in pressure within receptacle 16 causes receptacle 43 again expand its volume. Once again as self-cooling of the liquified refrigerant 23 occurs, the cycle repeats. This rapid cyclic variation in receptacle 16 volume causes the refrigerant 23 to evaporate at a higher rate than would be expected if refrigerant 23 were evaporating within a rigid receptacle of fixed volume.

THIRD PREFERRED EMBODIMENT

Figure 10:
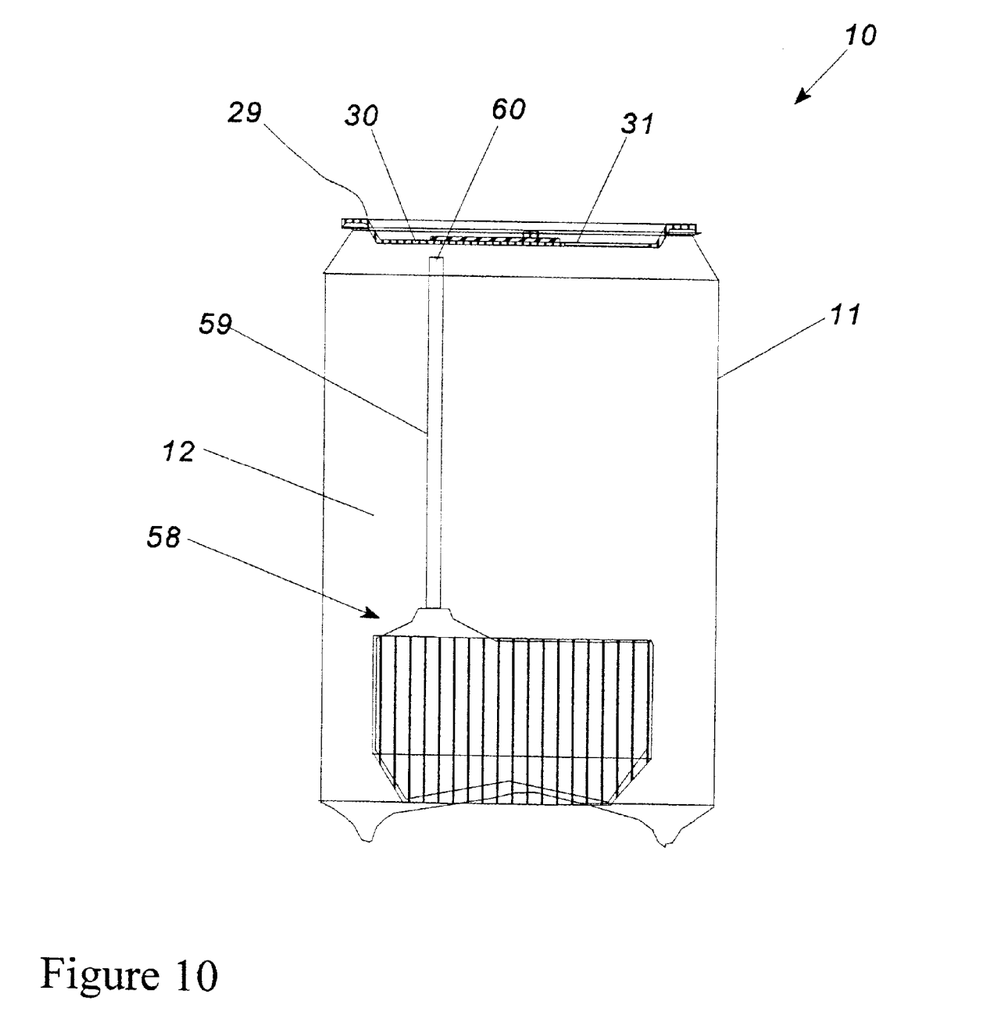
FIG. 10 shows the a partial cross-sectional view of the apparatus according to a third embodiment of the invention, with the receptacle in place filled with Fullerene nanotubes and refrigerant, and immersed in container contents with the receptacle tube opening above the container contents level, and the container lid seamed in place with the container rim.
Figure 11:
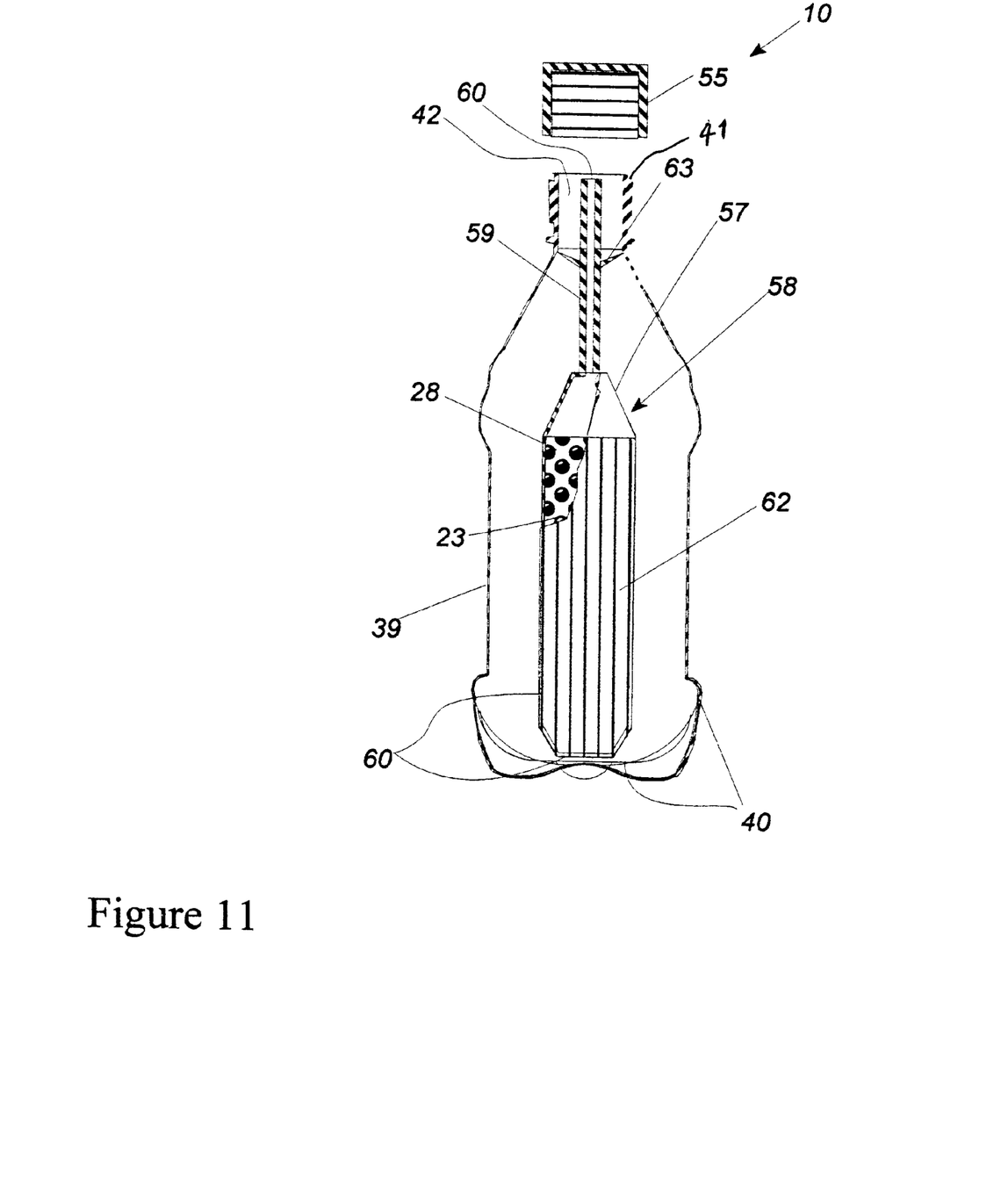
FIG. 11 shows a partial cross-sectional view of a bottle container and the receptacle according to a fourth embodiment of the invention, with the receptacle already filled with Fullerene nanotubes and immersed in the bottle container contents, the receptacle tube opening above the container contents level with the threaded closures ready to be applied to the bottle to form a seal.

Referring to FIGS. 10, and 11 a self-cooling container apparatus 10 containing a beverage or other food item 12 is disclosed, as well as apparatus 10 assembly and operation methods.

Apparatus 10 includes primary container 11 such as a can containing a beverage 12 and having a conventional unified bottom and side container wall 13 terminating in a container rim 14 defining a container opening 15. A secondary container placed inside and at the bottom of primary container 11 having a unified enclosure bottom and side wall with an expandable side wall portion 62 and a top wall 57 forming a refrigerant receptacle 58 and providing a broad surface area for heat transfer and having at least 80 percent of its volume filled with carbon Fullerene nanotubes 28 and a liquified refrigerant 23 such as carbon dioxide or nitrogen. A small vertical tube member 59 projects from the receptacle 58 and terminates above the product 12 level. The tube member 59 terminates above the product level 12 with a refrigerant port 60. A conventional container lid 29 is further provided for a metal can container, including a lid panel 30 with a lid opener mechanism 31 and a lid lateral edge 32.

METHOD OF OPERATION

Opening the lid opener mechanisms 31 releases the refrigerant 23 vapor initially present within the container 11. The loss of pressure causes the remaining refrigerant to boil off and change from the liquid phase to the gaseous phase, drawing heat from the beverage through the receptacle walls 56 to the Fullerene nanotubes 28 and exiting container 11 through lid opener mechanism 31. Once all the refrigerant 23 has been released the beverage 12 can flow freely around receptacle 58 through the lid opener mechanism 31 to be consumed.

METHOD OF ASSEMBLY

The method of manufacture includes the steps of filling the receptacle 58 with Fullerene nanotubes 28, sealing the receptacle 58; applying a vacuum to the receptacle 58 to remove all air and gases trapped in the Fullerene nanotubes 28; feeding cold liquified refrigerant 23 into the receptacle 58 so that refrigerant 23 is transferred into Fullerene nanotubes 28; lowering the filled receptacle 58 through the container rim 14 so that the receptacle 58 rests at the bottom surface 60 of the container 11; filling the beverage 12 into the container 11; seaming the container rim 14 to the lid lateral edge 32. After seaming, refrigerant 23 warms and starts to evaporate from the receptacle 58 by absorbing heat from the beverage 12, developing internal pressure inside receptacle 58 and transferring refrigerant 23 through the vertical tubular member 59 into the container 11. After the pressure inside the container 11 equals the pressure inside the receptacle 58, the refrigerant 23 stops evaporating, equilibrium is maintained, and there will be no stresses on the receptacle walls 56. The container 11 and the lid 29 are designed to withstand the equilibrium pressure during storage and the shelf-life of the apparatus 10.

STRUCTURAL VARIATIONS

It is preferred that receptacle walls 56 be formed from a flexible material such as a metal foil or preferably a suitable plastic and that receptacle walls 56 be undulated about its lateral circumference to maximize its surface area and the expandable maximum volume of the receptacle 58.

Vertical tubular member 59 is preferably a stiff tube with a very small inside diameter in the order of 0.01 inches to 0.03 inches in diameter allowing only refrigerant 23 to pass in and out of the receptacle 58, and extends above the product 12 level. Receptacle 58 can be manufactured by blow-molding or injection-molding by any plastic suitable for use with food and beverages.

OPERATIONAL CHARACTERISTICS

As liquid refrigerant 23 boils into a vapor state, it exits the Fullerene nanotubes 28 and exits receptacle 58. The refrigerant 23 extracts and carries away heat from the beverage 12. During this process, the pressure of the liquid phase is greater than one atmosphere and the receptacle 58 remains partially expanded. As the pressure of the refrigerant 23 falls due to rapid self-cooling, expandable side wall portion 62 relaxes and the weight of the beverage or food product 12 urges the receptacle 58 to a smaller volume. This reduction in volume agitates the cold Fullerene nanotubes 28 forcing further heat transfer. The increased heat absorption results in an increase in the rate of evaporation. This increase in the rate of evaporation produces more refrigerant 23 gases within receptacle 58 and thus causes the pressure of the refrigerant 23 to increase. The increase in pressure within receptacle 58 causes receptacle 58 to again expand its volume. Once again as self-cooling of the liquified refrigerant 23 occurs, the cycle repeats. This rapid cyclic variation in receptacle 58 volume causes the refrigerant 23 to evaporate at a higher rate than would be expected if refrigerant 23 were evaporating within a rigid receptacle of fixed volume.

FOURTH PREFERRED EMBODIMENT

Referring to FIGS. 11, a self-cooling container apparatus 10 containing a beverage or other food item 12 is disclosed, as well as apparatus 10 assembly and operation methods.

Apparatus 10 includes bottle container 39 containing a beverage 12 and having a conventional unified bottom and side container wall 40 terminating in a threaded container neck rim 41 defining a container opening 42. A secondary container placed inside and at the bottom of primary bottle container 39 having a unified bottom and side wall 60 with an expandable side wall portion 62 and a top wall 57 forming a refrigerant receptacle 58 and providing a broad surface area for heat transfer and having at least 80 percent of its volume filled with carbon Fullerene nanotubes 28 and a liquified refrigerant 23 such as carbon dioxide or nitrogen. A small vertical tube member 59 projects from the receptacle 58 and terminates above the product 12 level. The tube member 59 terminates above the product level 12 with a refrigerant port 60. A conventional beverage bottle threaded closure 55 is further provided.

METHOD OF OPERATION

Opening the threaded closure 55 releases the refrigerant 23 vapor initially present within the bottle container 39. The loss of pressure causes the remaining refrigerant to boil off and change from the liquid phase to the gaseous phase, drawing heat from the beverage through the receptacle walls 56 to the Fullerene nanotubes 28 and exiting bottle container 39 through threaded container neck rim 41. Once all the refrigerant 23 has been released the beverage 12 can flow freely around receptacle 58 through threaded neck rim 41 to be consumed.

METHOD OF ASSEMBLY

The method of manufacture includes the steps of filling the receptacle 58 with Fullerene nanotubes 28, sealing the receptacle 58; applying a vacuum to the receptacle 58 to remove all air and gases trapped in the Fullerene nanotubes 28; feeding liquified refrigerant 23 through vertical tube member 59 into the receptacle 58 so that refrigerant 23 is transferred into Fullerene nanotubes 28; lowering the filled receptacle 58 through the threaded container neck rim 41 so that the receptacle 58 rests at the bottom surface 60 of the bottle container 39 and so that the flange member 63 compresses and slides through the neck of the container and expands back to its original diameter in the larger opening within the container to permanently trap the receptacle 58 in the bottle container 39; filling the beverage 12 into the bottle container 39; sealing the threaded container neck rim 41 with threaded closure 55; After sealing, refrigerant 23 warms and starts to evaporate from the receptacle 58 by absorbing heat from the beverage 12, developing internal pressure inside receptacle 58 and transferring refrigerant 23 through the vertical tubular member 59 into the bottle container 39. After the pressure inside the bottle container 39 equals the pressure inside the receptacle 58, the refrigerant 23 stops evaporating, equilibrium is maintained, and there will be no stresses on the receptacle walls 56. The bottle container 39 and the threaded closure 55 are designed to withstand the equilibrium pressure during storage and the shelf-life of the apparatus 10.

STRUCTURAL VARIATIONS

It is preferred that receptacle walls 56 be formed from a flexible material such as a metal foil or preferably a suitable plastic and that receptacle walls 56 be made with undulated surfaces to maximize its surface area and the expandable volume of the receptacle 58.

Preferably vertical tubular member 59 is a stiff tube with a very small inside diameter in the order of 0.01 inches to 0.03 inches, and extends above the product 12 level. Receptacle 58 can be manufactured by blow-molding or injection-molding by any plastic suitable for use with food and beverages.

OPERATIONAL CHARACTERISTICS

As liquid refrigerant 23 boils into a vapor state, it exits the Fullerene nanotubes 28 and exits receptacle 58. The refrigerant 23 extracts and carries away heat from the beverage 12. During this process, the pressure of the liquid phase is greater than one atmosphere and the receptacle 58 remains partially expanded. As the pressure of the refrigerant 23 falls due to rapid self-cooling, expandable side wall portion 62 relaxes and the weight of the beverage or food product 12 urges the receptacle 58 to a smaller volume. This reduction in volume agitates the cold Fullerene nanotubes 28 forcing further heat transfer. The increased heat absorption results in an increase in the rate of evaporation. This increase in the rate of evaporation produces more refrigerant 23 gases within receptacle 58 and thus causes the pressure of the refrigerant 23 to increase. The increase in pressure within receptacle 58 causes receptacle walls 56 to again expand its volume. Once again as self-cooling of the liquified refrigerant 23 occurs, the cycle repeats. This rapid cyclic variation in receptacle 58 volume causes the refrigerant 23 to evaporate at a higher rate than would be expected if refrigerant 23 were evaporating within a rigid receptacle of fixed volume.

GENERAL COMMENTARY

Advantageously, the refrigerant 23 comprises a high pressure, naturally occurring non-flammable gas such as carbon dioxide or nitrogen. In some cases the refrigerant could be a mixture of n-butane, iso-butane and carbon dioxide, or some other combination of environmentally friendly naturally occurring inexpensive gases.

It should be appreciated that any combination of these gases may be employed to achieve the purpose of the invention, and the above mentioned gases serve only as examples. It is particularly advantageous to use carbon dioxide for this invention since the gas is allowed to be in direct contact with the beverage or food product, and so the apparatus can be used to maintain a required level of carbonation in the beverage while also serving to cool the beverage.

The present invention has a variety of major advantages. For example, the flexible-walled receptacle is not subjected to any stress since it is supported on all sides by its own transfer pressure acting on the contents of the container. The maximum stress on the receptacle walls is no more than that due to any particular change in shape that occurs. This means that, at full pressure, the collapsible walls of the receptacle will not be stretched or subjected to any hoop or lateral pressure stresses.

The surface area of the receptacle available for heat exchange process can advantageously be maximized at little or no additional cost during manufacture by simple rearranging the topology of the receptacle. The volume of the container's contents displaced by the flexible wall of the receptacle is negligible in view of the thin-walls employed.

The receptacle may advantageously be charged at any time before the beverage filling process and so the invention can be readily incorporated into any high speed production line such as a high speed canning or bottling production line without delaying the process.

Finally, from the above description, it will of course be appreciated that a particularly important aspect of the present invention is the use of Fullerene nanotubes to store high pressure refrigerants such as carbon dioxide and nitrogen. This feature is quite independent of the shape of the container, and also allows the receptacle to be in fluid communication with the container contents. Thus, no valving is needed during operation of the apparatus. This feature of the present invention is particularly advantages since research has shown that the cost of manufacturing specialized valving for the self-cooling container can be a high percentage of the total cost of the container. The combination of these features, together with the apparatus to rearrange the surface area, volume and shape of the receptacle in response to variations in the pressure internal or external to the receptacle make this invention the most promising apparatus for cooling the contents of a conventional container.

It will be appreciated that other modifications and variations may be made to the embodiments described and illustrated within the scope of this invention.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A rapid refrigeration apparatus comprising:

a container means having a container upper end, a container wall with a container opening in said container upper end bordered by a container rim, said container having liquid container contents;

a receptacle means extending within said container means, said receptacle means comprising a cup portion sized to fit into said container opening, said cup portion comprising a cup portion side wall, a cup portion lower end and a cup portion flange, said cup portion flange secured to said container rim and said cup portion side wall having an opening creating fluid communication between said container means and said cup portion, a permeable membrane extending across said cup portion and spaced above said cup portion lower end and defining a receptacle enclosed space, said membrane being gas permeable but not liquid permeable, said receptacle enclosed space containing Fullerene nanotubes, said Fullerene nanotubes containing liquid carbon dioxide;

and lid means sealingly secured to said container rim and comprising lid opening means for releasing said carbon dioxide from said receptacle through said membrane in gaseous form into the atmosphere and for releasing said container contents from said receptacle for consumption; said lid opening means comprising a lid opening means activation means for voluntarily opening said lid opening means at a selected moment in time.

2. A rapid refrigeration apparatus comprising:

a container means having a container upper end, a container wall with a container opening in said container upper end bordered by a container rim, said container having liquid container contents;

a receptacle means extending within said container means, said receptacle means comprising a cup portion sized to fit into said container opening, said cup portion comprising a cup portion side wall, a cup portion lower end and a cup portion flange, said cup portion flange being secured to said container rim and said cup portion side wall having an opening creating fluid communication between said container means and said cup portion, a closure wall extending across said cup portion and spaced above said cup portion lower end and defining a receptacle enclosed space, said closure wall comprising gas release means, said receptacle enclosed space containing liquid refrigerant storage means in the form of Fullerene nanotubes, said refrigerant storage means containing a multiphase refrigerant;

and lid means sealingly secured to said container rim and comprising lid opening means for releasing said refrigerant as it evaporates from said receptacle through said gas release means in gaseous form into the atmosphere such that evaporation of said refrigerant draws heat out of said container contents, and for releasing said container contents from said receptacle for consumption; said lid opening means comprising a lid opening means activation means for voluntarily opening said lid opening means at a selected moment in time.

3. The apparatus of claim 2, wherein said closure wall is flexible and bowed into said receptacle toward said cup portion lower end, until opening of said lid opening means, whereupon a decrease in pressure outside said receptacle means relative to a sustained pressure within said receptacle means causes said closure wall to bow outwardly and away from said cup portion lower end, such that said gas release means in said closure wall is elevated above the level of said container contents.

4. The apparatus of claim 2, wherein said container means is a bottle and wherein said lid means comprises a cap and said lid opening means comprises internal threads within the cap and corresponding external threads on said container means adjacent to said container opening for removably receiving and securing said cap sealingly over said container opening.

5. The apparatus of claim 2, additionally comprising an upright refrigerant release tube extending upwardly from said closure wall to a point above the level of said container contents, said refrigerant release tube being in fluid communication with said receptacle, such that, upon opening said lid opening means, said refrigerant evaporates and escapes from said receptacle through said refrigerant release tube above the level of said container contents and out of said container through said gas release means.

6. A rapid refrigeration apparatus comprising:

a container means having a container upper end, a container wall with a container opening in said container upper end bordered by a container rim, said container having liquid container contents;

a receptacle means extending within said container means, said receptacle means comprising a receptacle wall defining a receptacle enclosed space within said receptacle means, said receptacle means being connected to said container, and said receptacle wall comprising gas release means, said receptacle enclosed space containing liquid refrigerant storage means in the form of Fullerene nanotubes, said refrigerant storage means containing a multiphase refrigerant;

and lid means sealingly secured to said container rim and comprising lid opening means for releasing said refrigerant from said receptacle means through said gas release means in gaseous form into the atmosphere such that evaporation of said refrigerant draws heat out of said container contents, and for releasing said container contents for consumption.

7. The apparatus of claim 6, additionally comprising a refrigerant release tube extending upwardly from said closure wall to a point above the level of said container contents, said refrigerant release tube being in fluid communication with said receptacle means, such that, upon opening said lid opening means, said refrigerant evaporates and escapes from said receptacle means through said refrigerant release tube above the level of said container contents and out of said container means through said gas release means.

8. The apparatus of claim 7, wherein said container means is a can.

9. The apparatus of claim 6, wherein said receptacle means comprises an expandable receptacle wall.

10. The apparatus of claim 6, wherein said receptacle means comprises a flexible receptacle wall.

11. The apparatus of claim 7, wherein said container means is a bottle.

12. The apparatus of claim 11, wherein said lid means comprises a cap and said lid opening means comprises internal threads within the cap and corresponding external threads on said container means adjacent to said container opening for removably receiving and securing said cap sealingly over said container opening.

* * * * *